3,268,338
STABILIZED CAKE BATTER SYSTEM AND
PROCESS FOR PRODUCING SAME
Rudolf G. K. Strobel, Colerain Township, Hamilton County, Ohio, assignor to The Procter & Gamble Company, Cincinnati, Ohio, a corporation of Ohio
No Drawing. Filed Nov. 5, 1963, Ser. No. 321,436
15 Claims. (Cl. 99—92)

This invention relates to novel edible compositions of matter and, more particularly, to new and improved cake mixes, cake batter systems, and baked cakes.

The volume, texture, and eating qualities of baked cakes are dependent upon the interaction of various ingredients during the mixing operation in which an emulsion or cake batter is formed and the stabilization during subsequent baking and/or storage of the cake. Many attempts have been made to improve the emulsion characteristics of cake batter systems and cakes by incorporating therein small amounts of various edible additives which are able to improve the colloidal properties of the proteinaceous, amylaceous, or oleaginous constituents. Although a number of the conventional additives such as lecithin and the paritial glycerides of higher fatty acids have been found to be useful emulsifiers in cake batter systems, they have not been able to achieve the desired air incorporation with concurrent foam stability during preparation and baking of the cake.

Howard, U.S. Patents 3,145,107, 3,145,108 and 3,145,109, issued August 18, 1964, discloses novel shortenings containing various added amounts of certain alpha-phase crystal-tending emulsifiers and high temperature batter stabilizers. The described shortenings show the unique property of providing acceptable cakes of high volume with "single-stage batter mixing" in which all the cake ingredients are simultaneously mixed together in the mixing container as distinguished from the conventional multi-stage "creaming" or "blending" methods ordinarily used in cake batter preparation.

It has now been found that the stability of cake batter systems containing certain of the alpha-phase crystal-tending emulsifiers and high temperature batter stabilizers described in the above-mentioned Howard patents can be substantially improved by employing in the batter small amounts of certain non-toxic, water-soluble, polyvalent metal ion salts. These improvements are especially outstanding in the case of low-ratio cakes and the invention also is useful in cakes employing unbleached flour and flour having a high content of phytic acid.

In general, the improvements to cake batter systems achieved with this invention are obtained by employing in a cake batter emulsion comprising shortening, flour, and sugar, from about 0.5% to about 16%, by weight of the shortening, of an alpha-phase crystal-tending emulsifier, from about 0.1% to about 8%, by weight of the shortening, of a high temperature batter stabilizer, and from about 0.001% to about 1.0%, by weight of the batter emulsion, of a non-toxic, water-soluble, polyvalent metal ion salt.

The alpha-phase crystal-tending emulsifiers of this invention are both lipophilic and hydrophilic and contain in the molecule at least one higher fatty acid radical having from about 12 to about 22 carbon atoms and at least one free and unesterified hydroxyl group. Said emulsifiers are characterized by their tendency to crystallize in an alpha-phase rather than a beta- or beta-prime phase. These types of polymorphic crystalline structures can be identified by their X-ray diffraction patterns and are described in U.S. Patents 2,521,241–2, granted to Mitchell, September 5, 1950. The alpha-phase crystalline form is the least stable, least dense, and lowest melting of these crystalline forms.

Although it is not desired to be bound by any particular theory, it is believed that the film-forming tendency of the alpha-phase crystal-tending emulsifier promotes the incorporation of air during the preparation of a shortening emulsion, such as a cake batter. The incorporation of air in a cake batter is achieved essentially by the production of a foam through an extension of the protein film. However, the oily phase of the batter normally tends to hinder the foam building properties of the protein. It is believed that the film-forming tendency of the alpha-phase crystal-tending emulsifier at the oil-aqueous phase interface prevents the oily phase from acting as a foam depressant toward the protein.

Among the alpha-phase crystal-tending emulsifiers that can be used in the practice of this invention are the monoesters of straight chain aliphatic diols with saturated fatty acids, said diols containing from 3 to 5 carbon atoms and said saturated fatty acids containing from about 14 to about 22 carbon atoms, said materials being set forth by way of example only, and the invention is not to be limited to these specific alpha-phase crystal-tending emulsifiers.

The foregoing alpha-phase crystal-tending emulsifiers include, by way of example: propylene glycol monostearate; 1,3-propanediol monostearate; 1,4-butanediol monostearate; 1,3-butanediol monostearate; 1,5-pentanediol monostearate; and the corresponding monoesters of the preceding-named diols with myristic acid, palmitic acid, arachidic acid, and behenic acid. The said diol monoesters can be prepared by direct esterification or interesterification of the diol by reaction with the desired fatty acid or a fatty ester of a monohydric or polyhydric alcohol under appropriate conditions of temperature, either with or without catalyst and/or solvent. In the direct reactions between fatty acid and diol, the reactants are normally mixed in ratios of 1 mole of fatty acid to .75 or more moles of diol. The yield of monoester is enhanced by using solvents such as dimethylformamide, dimethylacetamide, dimethylsulfoxide, xylene, or toluene; and catalysts such as p-toluene sulfonic acid, sulfuric acid, hydrogen chloride, or zinc chloride and other acidic or salt types are particularly effective in accelerating the rate of esterification.

Interesterification of the diol with fatty esters of alcohols such as methanol, ethanol, and propanol as well as fatty esters of polyhydric alcohols such as glycol, propylene glycol, 1,3-propanediol, 1,4-butanediol, glycerol, erythritol, ribitol, sorbitol, mannitol, and others is a particularly good path to the diol monoesters. Mutual solvents are of good value including such solvents as dimethylformamide, dimethylacetamide, dimethylsulfoxide, dioxane, pyridine, xylene, and toluene. Catalysts of greatest value are such catalysts as sodium methoxide, benxyl trimethyl ammonium methoxide, sodium hydroxide and others described by Eckey, U.S. Patent 2,442,532, at column 24, line 18 et seq.

The reaction products produced by interesterification and containing diol monoester can be recovered by inactivation of the catalyst with an appropriate acid such as acetic or phosphoric acid. The reaction products can be freed of solvents by distillation and used as prepared, or they can be purified by water washing and crystallization techniques to further enrich the diol monoester content. Crystallization from an aliphatic hydrocarbon solvent such as hexane is particularly effective in enriching the monoester in the crystalline phase. Solvent partition methods are also highly effective in concentrating the diol monoesters.

The preferred alpha-phase crystal-tending emulsifier is propylene glycol monostearate.

The high temperature batter stabilizers of this invention are materials which are employed in the cake batter system which facilitate the retention of gas in the batter in the form of small bubbles until the cake is baked and minimize shrinkage during and subsequent to baking the cake.

Among the high temperature batter stabilizers which can be used in the practice of this invention are the following classes of materials which are set forth by way of example, but the invention is not to be limited to these specific high temperature batter stabilizers:

(a) The saturated fatty acids containing from about 14 to about 22 carbon atoms;

(b) the condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from about three to six carbon atoms and having from zero to four hydroxy groups, said condensation product having at least one free carboxyl group per molecule;

(c) the condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;

(d) the condensation product of a saturated straight chain fatty alcohol having from about 14 to about 22 carbon atoms with a dicarboxylic acid containing three to six carbon atoms and having no hydroxy groups, said condensatoin product having at least one free carboxyl group per molecule;

(e) the condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;

(f) the hydrogenated vegetable phosphatides having iodine values of less than about 30; and (g) the hydroxylated vegetable phosphatides.

The above classes of high temperature batter stabilizers are illustrated in greater detail, including typical methods of preparation, in the description that follows hereinafter. For example, the saturated fatty acids which can be employed in this invention include: myristic, palmitic, stearic, arachidic, and behenic acids. These "long-chain" fatty acids can be readily obtained from hydrogenated glycerides by saponification, acidulation, and isolation procedures. The fatty acid desired determines the choice of glyceridic material used. Thus, a technical grade of stearic acid can be obtained from highly hydrogenated soybean oil and a technical grade of behenic acid can be obtained from hydrogenated rapeseed oil.

Specific condensation products of partial fatty acid glycerides or diol monoesters with polycarboxylic acids which can be used as high temperature batter stabilizers in the practice of this invention include the condensation product of malic, tartaric, citric, citramalic, trihydroxy glutaric, mucic, saccharic, mannosaccharic, malonic, succinic, glutaric, methyl succinic, dimethyl succinic, adipic, tricarballylic, maleic, fumaric, itaconic, mesaconic, citraconic or aconitic acid with a monoglyceride, a diglyceride, or a mixture of mono- and diglycerides containing fatty acid radicals of the preceding named "long-chain" fatty acids, and if desired, unsaturated straight chain fatty acid radicals having from about 14 to about 22 carbon atoms in sufficient quantities to raise the iodine value of the condensation product not higher than 60, or with a monoester of propylene glycol, 1,3-propanediol, 1,4-butanediol, 1,3-butanediol, or 1,5-pentanediol with any of the preceding named "long-chain" fatty acids.

The condensation products of partial fatty acid glycerides or diol monoesters with polycarboxylic acids can be obtained by direct esterification. This reaction is advantageously carried out in a mutual solvent such as dimethyl formamide, dimethylacetamide, dioxane, xylene, and toluene, either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The desired condensation products are isolated by appropriate distillation, and/or washing, and/or crystallization treatments when required to remove solvents, excess reactants and impurities. These condensation products should contain one or more unesterified carboxyl groups per molecule.

Among the condensation products of fatty acids and hydroxy polycarboxylic acids which can be used in the practice of this invention, are the condensation products of the above-mentioned "long-chain" fatty acids with malic, tartaric, citric, citramalic, trihydroxy glutaric, mucic, saccharic, and mannosaccharic acids.

The high temperature batter stabilizer condensation products of fatty acids and hydroxypolycarboxylic acids preferably are prepared by acylating the hydroxy polycarboxylic acid with fatty acid chlorides by reaction in appropriate solvents such as pyridine, quinoline, dioxane, dimethylformamide, dimethylacetamide and mixtures thereof, either with or without addition of lipid solvents such as chloroform, benzene, and ethyl ether. These reactions can be carried out over a wide temperature range of from about 0° C. to about 150° C. or higher as long as undesirable side reactions are avoided. Upon completion of the acylation reaction, the stabilizers are isolated by dilution with an aqueous phase followed by washing, and/or distillation, and/or crystallization when required to remove solvents, excess reactants, and impurities. The method described in U.S. Patent 2,251,695, granted to Tucker, August 5, 1941, is an effective example of such a procedure. The condensation product obtained by this method should contain at least one free carboxyl group per molecule.

The condensation products of fatty alcohols and dicarboxylic acids which form suitable high temperature batter stabilizers include the condensation products of succinic, methyl succinic, dimethyl succinic, glutaric, malonic, adipic, maleic, or fumaric acids with saturated "long-chain" fatty alcohols containing from about 14 to about 22 carbon atoms such as myristyl, cetyl, stearyl, arachidyl, and behenyl alcohols. These condensation products also should contain one free carboxyl group per molecule and can be prepared by the same procedures used to prepare the condensation products of the partial fatty acid glycerides or diol monoesters with polycarboxylic acids, using the appropriate dicarboxylic acid and fatty alcohol.

Examples of condensation products of partial fatty acid glycerides and monoesters of polycarboxylicacids which can be used as high temperature batter stabilizers in the practice of this invention are the condensation products of the above-mentioned mono- and/or diglycerides of the "long-chain" fatty acids with monoesters of malic, tartaric, citric, citramalic, trihydroxy glutaric, mucic, saccharic, mannosaccharic, malonic, succinic, glutaric, methyl succinic, dimethyl succinic, adipic, tricarballylic, fumaric, itaconic, mesaconic, citraconic, or aconitic acid, with any of the preceding-named "long-chain" fatty alcohols. A particularly desirable product of the class is stearyl monoglyceridyl citrate. These condensation products preferably are prepared by reacting the polycarboxylic acid with a mixture of the alcohols and a mixture of the mono- and diglycerides at elevated temperatures, for example, 150° C. to 165° C., in an inert atmosphere and under conditions where steam is removed.

The hydrogenated vegetable phosphatide which can be used as a high temperature batter stabilizer in the practice of this invention is an ordinary vegetable phosphatide, such as soya or corn lecithin which has been substantially hydrogenated to an iodine value (I.V.) of less than about 30 and preferably to less than about 15. The hydrogenation can be conducted by various means, e.g., such as contacting the phosphatide with hydrogen in the presence of a catalyst with or without solvents at elevated temperatures and pressures. Examples of suitable methods of hydrogenation are described in U.S. Patent 2,870,179, granted to Jacini, January 20, 1959; U.S. Patent 2,907,777, granted to Cole, October 6, 1959; and U.S. Patent 3,026,341, granted to Davis, March 20, 1962.

An example of a vegetable phosphatide which can be used in the practice of this invention is commercial lecithin which has been hydrogenated to an iodine value of about 15. Commercial lecithin is derived principally from soybeans and is a crude phosphatide material which generally contains on the order of about 60% to 70% phosphatides and about 30% to 40% oil. This crude material contains not only lecithin, but also associated phosphatides such as cephalin and inositide. The commercial lecithins as well as the purse phosphatide compounds, such as lecithin, can be hydrogenated to form suitable materials for this invention.

Another treatment of vegetable phosphatide which can be carried out to form suitable high temperature batter stabilizers for the practice of this invention is hydroxylation. Hydroxylation can be carried out by means of known hydroxylating reagents such as potassium permanganate and peracetic acid. Suitable methods of preparation are described in U.S. Patent 2,445,948, granted to Wittcoff, July 27, 1948. The hydroxylation will reduce the degree of unsaturation of the phosphatide such that the iodine value will be decreased by about 10 to about 50 units.

As an example of a suitable hydroxylated vegetable phosphatide, a commercial soy lecithin originally composed of about 65% phosphatide and 35% soybean oil can be hydroxylated to an iodine value of about 80. A suitable commercial hydroxylated lecithin is "Centrolene S."

Although specific methods of preparing the aforesaid alpha-phase crystal-tending emulsifiers and high temperature batter stabilizers have been described herein, it is not intended that the invention should be limited to any particular method of preparation of these materials.

The metals which can be used to form water-soluble polyvalent metal ion sals for use in this invention in combination with the above-mentioned alpha-phase crystal-tending emulsifiers and high temperature batter stabilizers include copper, magnesium, calcium, zinc, strontium, cadmium, barium, aluminum, titanium, tin, manganese, iron, cobalt and nickel. The non-toxic, water-soluble salts of these metals include compounds such, for example, as calcium chloride, magnesium chloride, magnesium bromide, magnesium iodate, magnesium iodate, stannous chloride, stannous stearate, polytitanyl stearate, aluminum sulfate, zinc acetate, strontium tartrate, cupric gluconate, manganese succinate, nickel nitrate, cobalt chloride, sodium aluminum sulfate, and ferric manganese citrate. It will be understood that the invention is not limited to the foregoing specific polyvalent metal ion salts which are merely illustrative of the salts which can be used in the invention. In selecting a suitable polyvalent metal ion salt it is important to choose one having an anion which forms a non-toxic salt with the polyvalent cation and one which is sufficiently soluble in water so that an effective amount of the salt of from about 0.001% to about 1.0% will be dissolved in the aqueous batter system.

The polyvalent cationic proteins such as protamines can also be used to provide desirable cake baking results in combination with the alpha-phase crystal-tending emulsifier and high temperature batter stabilizer.

Although the precise mechanism by which the polyvalent cation operates to stabilize cake batter systems containing the above mentioned alpha-phase crystal-tending emulsifiers and high temperature batter stabilizers is not completely understood and it is not desired to be bound by any particular theory, it is believed that the stabilization is effected by the formation of interfacial films in the batter consisting of surface active lipids and proteins fortified by chemical bonds between the negatively charged lipids (and proteins) and the positively charged polyvalent cations. Furthermore, it is believed that the interaction of the polyvalent cations with the batter system increases the hydrophobic character of the interfacial films. This prevents the migration of the interfacial film components into the aqueous phase which results in coalescence of the dispersed air and oil in the batter system. The coalescence of air and oil is caused by the depletion (increasing over a period of time) of the surface active materials in the interfacial films to a degree of instability of the colloidal system representing the cake batters.

All types of cakes can be made with the products of this invention. White cakes, yellow cakes, chocolate cakes, devil's food cakes, marble cakes, spice cakes, pound cakes, high-ratio as well as low ratio cakes, and many other cakes of excellent quality can be prepared simply by mixing the cake ingredients together in a single mixing step followed by baking.

Illustrative examples of dry cake mix formulae embodying the concept of the invention are the following, all proportions by weight.

YELLOW TYPE CAKE

| Ingredients: | Percent |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Egg solids | 0–5.0 |
| Flavoring | 0.1–5.0 |
| Coloring, minor amount, if any. | |

CHOCOLATE TYPE CAKE

| Ingredients: | |
|---|---|
| Sugar | 35–50 |
| Flour | 25–50 |
| Shortening | 9–15 |
| Non-fat dried milk solids | 0.5–3.0 |
| Leavening | 1.0–4.0 |
| Cocoa | 4.0–8.0 |
| Salt | 0.5–2.0 |
| Flavoring | 0.1–1.0 |
| Coloring, minor amount, if any. | |

WHITE TYPE CAKE

| Ingredients: | |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Flavoring | 0–5.0 |

The shortenings which can be employed in the cake batter system of this invention include solid or plastic as well as liquid or semi-fluid glyceride shortenings derived from animal, vegetable or marine fats and oils, including synthetically prepared shortenings. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil and lard; and they can be otherwise formed by various organic syntheses. The shortening can also contain minor amounts of conventional cake emulsifier such as the higher fatty acid mono- and diglycerides.

The cake batter will also usually employ cake flour or other proteinaceous material as well as sugar and other conventional cake ingredients. As mentioned hereinbefore, this invention is particularly useful for the preparation of low-ratio cakes and also useful in cakes employing unbleached flour and flour having a high phytic acid content. The low-ratio cakes are those employing a low-ratio of sugar to flour, usually on the order of about 1:1 by weight, as distinguished from the high-ratio cakes which employ a substantially higher ratio of sugar to flour, such as up to about 1.3:1. Although the polyvalent metal ion salts will improve cake batter systems containing alpha-phase crystal-tending emulsifiers and high temperature batter stabilizers when high-ratio cakes and cakes employing bleached flour are prepared, the improvements are particularly outstanding in low-ratio cakes and the invention also is useful in cakes employing unbleached flour or high phytic acid flour. The latter three types of cakes frequently are complete failures even when the alpha-phase crystal-tending emulsifiers and high temperature batter stabilizers are present in the batter system, for example, when the alpha-phase crystal-tending emulsifier is propylene glycol monostearate and the high temperature batter stabilizer is hydrogenated lecithin.

It is desirable to employ the shortening, flour, sugar, alpha-phase crystal-tending emulsifier, high temperature batter stabilizer, and polyvalent metal ion salt in combination with conventional cake ingredients in the form of a dry mix which can be packaged and marketed as a complete cake mix for convenient use by the consumer. These are the so-called "prepared cake mixes." The additives of this invention can also be incorporated in shortenings which can be sold to the consumer for the preparation of recipe cake batters.

The following examples further illustrate the invention but the invention is not limited to these specific examples. All percentages are by weight unless otherwise specified. For convenience in use, the amount of polyvalent metal ion salt is shown in parts by weight in milligrams rather than in percent by weight of the batter.

*Example 1*

A fluid shortening was prepared by mixing together with slight warming the following materials in the stated amounts:

| | Percent by weight |
|---|---|
| Refined and bleached cottonseed oil | 84 |
| Propylene glycol stearate (approximately 1/2 each mono- and diesters), hereinafter referred to as PGMS | 14 |
| Hydrogenated lecithin (I.V. 15) | 2 |

The above fluid shortening was used to prepare a standard low ratio white cake consisting of the following ingredients:

| | Parts by weight, g. |
|---|---|
| Granulated sugar | 116.5 |
| Shortening | 31.2 |
| Dextrose | 5.7 |
| Non-fat milk solids | 8.5 |
| Sodium chloride | 2.3 |
| Leavening: | |
|    Sodium bicarbonate | 2.08 |
|    Sodium acid pyrophosphate | 1.55 |
|    Monocalcium phosphate | 1.45 |
| Cake flour | 115.0 |
| Flavor | 0.25 |
| Egg whites (fresh) | 30.0 |

The shortening and egg whites were added to a mixture of the dry ingredients and then 150 ml. of water were mixed in with an electric mixer at 500 r.p.m. for 3 minutes. 440 grams of batter were placed in an 8-inch pan and baked at 375° F. for 25 minutes.

Another white cake was baked using the same procedure and cake formula as above except that 2.0 grams of $Al_2(SO_4)_3 \cdot 18H_2O$ was employed in the cake batter as an additional dry ingredient.

The following table shows the hot and cold volumes obtained for these two cakes as well as the cake profile and cellular (grain) characteristics. The cake volumes in this and subsequent examples are stated in cc. per 440 g. of batter. The hot volumes (HV) were measured immediately after the 25 minute baking period; and the cold volumes (CV) were measured 15 minutes thereafter. An improvement in cake volume of more than 50 cc./440 g. batter is considered to be a substantial improvement in volume.

The cake profile grade describes the difference in height of the cake layer between the center and the edge of the cake. The positive and negative integers represent the number of units higher and lower, respectively, by which the height of the center of the cake varies from the edge. Each unit equals two (2) millimeters. For example, a cake profile of from −3 to −10 indicates an undesirable dip in the center of the cake of from 6 to 20 mm. On the other hand, a cake profile of from about +5 to about +15 indicates a suitable rise in the center of the cake of from 10 to 30 mm. A cake profile substantially higher than +30 would be undesirable.

The cellular grade or grain is a subjective measurement of the coarseness or fineness of cake texture. A grain value of from about 20 to about 25 is standard. Grain values ranging from about 30 to about 35 indicate very fine grain. In some cases, however, the fineness in texture may be due to shrinkage of the cake in volume. Grain values ranging from about 15 to about 20 indicate somewhat coarse grain, though not undesirable if the over-all cake volume and profile is satisfactory. In those instances where unstable or very unstable batters are indicated in the examples, the products were such that grain and profile could not be measured.

TABLE I

| Cake | Hot Volume (cc./440 g.) | Cold Volume (cc./440 g.) | Cake Profile Grade | Cellular (Grain) Grade |
|---|---|---|---|---|
| Control cake [1] without added $Al_2(SO_4)_3 \cdot 18H_2O$ | 920 | 815 | Very unstable | |
| With 2.0 g. $Al_2(SO_4)_3 \cdot 18H_2O$ | 1,245 | 1,185 | +7 | 32 |

[1] Control cake in this and subsequent examples identifies the cake without the water-soluble polyvalent metal ion salt which is used as a standard of comparison.

Example 2

Example 1 was repeated for a series of similar cakes to show the effect of various polyvalent metal ion salts, added to the dry ingredients.

TABLE II

| Salt | HV | CV | Profile | Grain |
|---|---|---|---|---|
| Control | 920 | 815 | Very unstable | |
| With 863 mg. $ZnSO_4 \cdot 7H_2O$ | 1,275 | 1,205 | −1 | 19 |
| With 740 mg. $MgSO_4 \cdot 7H_2O$ | 1,390 | 1,255 | +6 | 15 |
| With 1,686 mg. $Fe_2(SO_4)_3 \cdot 9H_2O$ | 685 | 600 | Very unstable | |
| With 3,370 mg. $Fe_2(SO_4)_3 \cdot 9H_2O$ | 1,145 | 1,045 | +4 | 30 |
| With 55 mg. $CaCl_2$ | 985 | 895 | Unstable | |
| With 100 mg. $CaCl_2$ | 1,420 | 1,265 | +8 | 33 |
| With 200 mg. $CaCl_2$ | 1,475 | 1,385 | +9 | 24 |
| With 3,000 mg. $NaAl(SO_4)_2$ | 1,555 | 1,290 | −4 | 33 |
| With 2,634 mg. $NaH_{14}Al_3(PO_4)_8 \cdot 4H_2O$ | 760 | 680 | Unstable | |

Example 3

In order to demonstrate directly that the polyvalent cation is involved in the noted improvement, the cake batter of Example 1 was used and to it was added a known calcium ion sequestrant, sodium phytate.

TABLE III

| Cake | HV | CV | Profile | Grain |
|---|---|---|---|---|
| 1. Control | 985 | 895 | Unstable | |
| 2. Control with 100 mg. $CaCl_2$ | 1,420 | 1,265 | +8 | 33 |
| 3. Cake 2 plus 100 mg. sodium phytate | 1,450 | 1,320 | +10 | 24 |
| 4. Cake 2 plus 300 mg. sodium phytate | 775 | 730 | Unstable | |

Example 4

A shortening was prepared of the following composition:

| | Percent |
|---|---|
| Cottonseed oil | 84 |
| PGMS | 14 |
| Hydrogenated lecithin | 2 |

This shortening was used in a low ratio yellow cake of the following composition:

| | Parts by weight g. |
|---|---|
| Granulated sugar | 116.5 |
| Cake flour | 115.0 |
| Shortening | 31.2 |
| Non-fat dry milk | 8.5 |
| Dextrose | 5.7 |
| Sodium chloride | 2.3 |
| Sodium bicarbonate | 2.08 |
| Sodium acid pyrophosphate | 1.55 |
| Monocalcium phosphate | 1.45 |
| Flavor | 0.25 |
| Whole egg (fresh) | 46.0 |
| Water | 134.0 |

The shortening and fresh egg were added to a mixture of the dry ingredients and then 150 ml. of water were mixed in with an electric mixer at 500 r.p.m. for 3 minutes. 440 grams of batter were placed in an 8-inch pan and baked at 375° F. for 25 minutes.

To a similar cake batter 200 mg. of $CaCl_2$ was added as a dry ingredient. The following data illustrates the volume and texture improvements noted.

TABLE IV

| Cake | HV | CV | Profile | Grain |
|---|---|---|---|---|
| Control | 910 | 860 | −1 | (1) |
| With 200 mg. $CaCl_2$ | 1,475 | 1,385 | +9 | 24 |

[1] Starch fallout.

Example 5

A variety of commercial high quality cake flours was used in the cake batter system of composition corresponding to that of Example 1.

The effect of polyvalent metal ion salts on the batters prepared from each of these flours was determined. In these cases, calcium chloride was added as a dry ingredient and sodium aluminum sulfate was added as a constituent of the baking powder.

The following data illustrates the benefits derived by use of the salts with each of the flours:

TABLE V

| Flour | Polyvalent Salt | HV | CV | Profile | Grain |
|---|---|---|---|---|---|
| I | | 820 | 745 | Unstable | |
| | 1.3 g. $NaAl(SO_4)_2$ | 1,365 | 1,310 | +5 | 21 |
| | 330 mg. $CaCl_2$ | 1,295 | 1,200 | +6 | 28 |
| II | | 825 | 735 | Unstable | |
| | 1.3 g. $NaAl(SO_4)_2$ | 1,594 | 1,260 | −4 | 32 |
| | 55 mg. $CaCl_2$ | 1,415 | 1,290 | +7 | 27 |
| III | 12 mg. $CaCl_2$ | 1,205 | 1,120 | +5(Unstable) | |
| | 25 mg. $CaCl_2$ | 1,440 | 1,345 | +9 | 26 |
| IV | 12 mg. $CaCl_2$ | 920 | 851 | Unstable | |
| | 55 mg. $CaCl_2$ | 1,350 | 1,225 | +9 | 22 |

Example 6

Example 1 was repeated except that 2% citric acid ester of mono- and diglycerides having 12 to 22 carbon atoms was substituted for the 2% hydrogenated lecithin in the shortening component.

Cake volume, cake profile, and cellular grade are shown in the following table:

TABLE VI

| Cake | HV | CV | Profile | Grain |
|---|---|---|---|---|
| Control | 950 | 840 | Very unstable | |
| With 2.0 g. $Al_2(SO_4)_3 \cdot 18H_2O$ | 1,365 | 1,235 | +5 | 38 |

Example 7

Example 6 was repeated except that $CaCl_2$ was used to replace the $Al_2(SO_4)_3 \cdot 18H_2O$.

TABLE VII

| Cake | HV | CV | Profile | Grain |
|---|---|---|---|---|
| Control | 905 | 840 | Very unstable | |
| With 10 mg. $CaCl_2$ | 930 | 820 | Very unstable | |
| With 60 mg. $CaCl_2$ | 1,385 | 1,250 | +5 | 29 |

Example 8

A series of shortenings were prepared consisting of 14% PGMS +1% of various high temperature batter stabilizers in refined bleached cottonseed oil. With each shortening, two low-ratio white cakes of composition as in Example 1 were baked, one without and one with an added polyvalent metal ion salt.

The results are shown in the following table:

TABLE VIII

| High Temperature Batter Stabilizer | Polyvalent Salt | HV | CV | Profile | Grain |
|---|---|---|---|---|---|
| Stearic Acid | | 1,235 | 1,155 | +4 | 14 |
| | 300 mg. CaCl₂ | 1,415 | 1,320 | +8 | 16 |
| Malic Palmitate | | 1,400 | 1,325 | +7 | 28 |
| | 300 mg. CaCl₂ | 1,485 | 1,405 | +10 | 26 |
| Stearoyl lactic acid | | 1,420 | 1,330 | +13 | 31 |
| | 300 mg. CaCl₂ | 1,495 | 1,410 | +10 | 28 |
| Tartaric distearate | | 1,425 | 1,250 | +10 | 34 |
| | 300 mg. CaCl₂ | 1,545 | 1,355 | +8 | 36 |
| Distearin hydrogen succinate | | 1,455 | 1,330 | +7 | 34 |
| | 300 mg. CaCl₂ | 1,460 | 1,375 | +11 | 32 |
| Octadecyl hydrogen succinate | | 1,555 | 1,440 | +9 | 34 |
| | 300 mg. CaCl₂ | 1,555 | 1,475 | +10 | 30 |
| Stearoyl propylene glycol hydrogen succinate. | | 1,655 | 1,375 | +1 | 36 |
| | 300 mg. CaCl₂ | 1,545 | 1,465 | +9 | 34 |
| Hydroxylated lecithin[a] | | 800 | | Unstable | |
| | 600 mg. CaCl₂ | 1,490 | 1,370 | +5 | 28 |

[a] 2% of shortening.

When stearyl monoglyceridyl citrate is substituted for stearic acid in the above example, substantially equivalent results are obtained.

Example 9

A fluid shortening was prepared by mixing together the following ingredients in the stated amounts:

| | Percent by weight |
|---|---|
| Refined and bleached cottonseed oil | 84 |
| PGMS | 14 |
| Stearic acid | 2 |

The above fluid shortening was used to prepare a single-stage batter mixed high ratio white cake consisting of the following ingredients:

| | Parts by weight, g. |
|---|---|
| Cake flour | 107.0 |
| Granulated sugar | 133.0 |
| Sodium chloride | 2.5 |
| Double-acting baking powder (Calumet) | 6.8 |
| Shortening | 47.5 |
| Whole milk | 130.0 |
| Egg whites (fresh) | 60.0 |

The fluid shortening and the other liquid ingredients (milk and egg whites) were added to all of the dry mix ingredients and simultaneously mixed together with a Sunbeam table model electric mixer at 500 r.p.m. for a total of 4 minutes. 400 grams of batter were placed in an 8-inch pan and baked in an oven at 365° F. for about 25 minutes.

Three similar cakes were baked using the same procedure and cake formula as above except that a small amount of CaCl₂ was employed in the cake batter as an additional dry ingredient.

The following table shows the cold volumes obtained for these four cakes as well as the cake profile and grain characteristics.

TABLE IX

| Cake | CV | Profile | Grain |
|---|---|---|---|
| Control cake | 1,200 | −3 | 31 |
| Cake with 53 mg. CaCl₂ | 1,280 | −2 | 28 |
| Cake with 105 mg. CaCl₂ | 1,425 | +9 | 24 |
| Cake with 210 mg. CaCl₂ | 1,370 | +9 | 36 |

Example 10

Example 9 repeated with a series of calcium salts of varying water solubility. All salts were added in quantity to give 0.008 M concentration in the aqueous phase of the batter.

TABLE X

| Salt | Solubility, g./100 ml. H₂O | HV | CV | Profile | Grain |
|---|---|---|---|---|---|
| Control (no added salt) | | 1,205 | 1,185 | −3 | 31 |
| Calcium chloride | 159 | 1,530 | 1,440 | +10 | 28 |
| Calcium acetate | 30 | 1,330 | 1,315 | +11 | 24 |
| Calcium sulfate | 0.3 | 1,205 | 1,130 | −2 | 36 |
| Calcium citrate | 0.2 | 1,095 | 1,060 | −4 | 32 |
| Calcium stearate | 0 | 1,025 | 965 | | |

Example 11

The shortening and cake batter system of Example 9 was used to prepare a series of cakes containing various polyvalent metal ion salts.

TABLE XI

| Cake | HV | CV | Profile | Grain |
|---|---|---|---|---|
| Control | 1,205 | 1,185 | −3 | 31 |
| With 285 mg. BaCl₂ | 1,475 | 1,440 | +11 | 26 |
| With 240 mg. CdCl₂ | 1,555 | 1,490 | +14 | 26 |
| With 330 mg. Cu(NO₃)₂·3H₂O | 1,205 | 1,150 | −2 | 27 |
| With 1,260 mg. Cu(NO₃)₂·3H₂O | 1,440 | 1,350 | +9 | 33 |
| With 210 mg. CaCl₂ added in shortening | 1,425 | 1,350 | +6 | 20 |
| With 186 mg. ZnCl₂ added in shortening | 1,425 | 1,350 | +6 | 26 |
| With 250 mg. SnCl₂ added in shortening | 1,585 | 1,490 | +14 | 30 |

Example 12

In order to demonstrate directly that the polyvalent cation is involved in the noted improvement, the cake batter system of Example 9 having 210 mg. CaCl₂ was used and to it was added a known calcium ion sequestrant, sodium ethylene diamine tetra-acetate (Na₄EDTA).

TABLE XII

| Cake | HV | CV | Profile | Grain |
|---|---|---|---|---|
| 1. Control | 1,205 | 1,185 | −3 | 31 |
| 2. Control with 210 mg. CaCl₂ (.008 M) | 1,425 | 1,350 | +6 | 30 |
| 3. Cake with Na₄EDTA (.008 M) | 1,070 | 1,130 | −3 | 32 |

Example 13

A series of shortenings were prepared consisting of 14% PGMS and various high temperature batter stabilizers in cotton-seed oil. These shortenings were used in the high-ratio white cake systems of Example 9. With each shortening, the effect of added polyvalent metal salt was determined.

When soybean oil-based shortenings are substituted for the cottonseed oil-based shortenings in the above examples, substantially similar results are obtained. When 1,3-propanediol monopalmitate is substituted for the pro-

TABLE XIII

| High Temperature Batter Stabilizer | Salt | HV | CV | Profile | Grain |
|---|---|---|---|---|---|
| 1% Stearic Acid | | 1,300 | 1,195 | +5 | 33 |
| | 600 mg. CaCl₂ | 1,360 | 1,250 | +10 | 33 |
| | 1,000 mg. CaCl₂ | 1,390 | 1,310 | +13 | 30 |
| 2% Stearoyl Propylene Glycol Hydrogen Succinate. | | 1,060 | 1,025 | −7 | 27 |
| | 600 mg. CaCl₂ | 1,275 | 1,205 | +7 | 16 |
| 2% Stearoyl Propylene Glycol Hydrogen Glutarate. | | 1,185 | 1,135 | −1 | 31 |
| | 300 mg. CaCl₂ | 1,515 | 1,450 | +13 | 18 |
| | 600 mg. CaCl₂ | 1,395 | 1,330 | +11 | 15 |
| 2% Stearoyl Propylene Glycol Hydrogen Adipate. | | 1,160 | 1,120 | −4 | 2 phase |
| | 300 mg. CaCl₂ | 1,420 | 1,390 | +9 | 15 |
| | 600 mg. CaCl₂ | 1,245 | 1,170 | +2 | 15 |

*Example 14*

Shortenings containing 14% PGMS and various high temperature batter stabilizers were prepared as in Example 13. These shortenings were used in the high ratio white cake batter system of Example 9 except that the leavening system of Example 9, 6.8 parts by weight of double-acting baking powder, was replaced by a leavening system composed of the following constituents and contributing the indicated amounts to the batter composition.

|  | Parts by weight in batter |
|---|---|
| Sodium acid pyrophosphate (SAPP-28) | 1.55 |
| Monocalcium phosphate (V-90) | 1.49 |
| Sodium bicarbonate | 2.08 |
| Cornstarch | 2.08 |
| Total leavening | 7.20 |

With each shortening used, the effect of polyvalent metal salt added to the batter system as a dry ingredient was determined.

TABLE XIV

| High Temperature Batter Stabilizer | Wr. of CaCl₂ Added | HV | CV | Profile | Grain |
|---|---|---|---|---|---|
| 1% malic palmitate | | 1,075 | 1,020 | −8 | 27 |
| | 300 mg. | 1,205 | 1,115 | −2 | 27 |
| 1% tartaric distearate | | 1,470 | 1,085 | +4 | 30 |
| | 300 mg. | 1,445 | 1,145 | +6 | 33 |
| 1% monostearin dihydrogen succinate. | | 1,190 | 1,130 | −2 | 26 |
| | 300 mg. | 1,410 | 1,335 | +7 | 29 |

*Example 15*

Example 1 was repeated except that 1.0 g. of the basic protein, protamine sulfate, was used in place of the metal salt.

TABLE XV

| Cake | HV | CV | Profile | Grain |
|---|---|---|---|---|
| Control | 920 | 815 | Very unstable | |
| With 1.0 g. protamine sulfate (acid form) | 1,310 | 1,210 | +4 | 21 |
| With 1.0 g. protamine sulfate (neutralized form) | 1,415 | 1,305 | +10 | 27 | pylene glycol monostearate in the above examples, substantially similar results are obtained.

What is claimed is:

1. A process for improving a cake batter system comprising shortening, flour, water and sugar, which comprises incorporating in the batter emulsion from about 0.5% to about 16%, by weight of the shortening, of an alpha-phase crystal-tending emulsifier which is lipophilic and hydrophilic and contains at least one higher fatty acid radical having from about 12 to about 22 carbon atoms and at least one free and unesterified hydroxyl group, from about 0.1% to about 8%, by weight of the shortening, of a high temperature batter stabilizer, and from about 0.001% to about 1.0%, by weight of the batter emulsion, of a non-toxic, water-soluble polyvalent metal ion salt.

2. The process of claim 1 in which the alpha-phase crystal-tending emulsifier is selected from the group consisting of monoesters of straight chain aliphatic diols with saturated fatty acids, said diols containing from 3 to 5 carbon atoms and said saturated fatty acids containing from about 14 to about 22 carbon atoms.

3. The process of claim 1 in which the alpha-phase crystal-tending emulsifier is propylene glycol monostearate.

4. The process of claim 1 in which the high temperature batter stabilizer is selected from the group consisting of (a) the saturated fatty acids containing from about 14 to about 22 carbon atoms;

(b) the condensation product of material selected from the group consisting of partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from three to six carbon atoms and having from zero to four hydroxy groups, said condensation product having at least one free carboxyl group per molecule;

(c) the condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;
(d) the condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;
(e) the condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;
(f) the hydrogenated vegetable phosphatides having iodine values of less than about 30; and
(g) the hydroxylated vegetable phosphatides.

5. The process of claim 1 in which the polyvalent metal ion is derived from salts selected from the group consisting of the non-toxic, water-soluble salts of copper, magnesium, calcium, zinc, strontium, cadmium, barium, aluminum, titanium, tin, manganese, iron, cobalt, and nickel.

6. A cake batter system comprising shortening, flour, water and sugar, improved with from about 0.5% to about 16%, by weight of the shortening, of an alpha-phase crystal-tending emulsifier which is lipophilic and hydrophilic and contains at least one higher fatty acid radical having from about 12 to about 22 carbon atoms and at least one free and unesterified hydroxyl group, from about 0.1% to about 8%, by weight of the shortening, of a high temperature batter stabilizer, and from about 0.001% to about 1.0%, by weight of the batter emulsion, of a non-toxic, water-soluble polyvalent metal ion salt.

7. The cake batter system of claim 6 in which the alpha-phase crystal-tending emulsifier is selected from the group consisting of monoesters of straight chain aliphatic diols with saturated fatty acids, said diols containing from 3 to 5 carbon atoms and said saturated fatty acids containing from about 14 to about 22 carbon atoms.

8. The cake batter system of claim 6 in which the alpha-phase crystal-tending emulsifier is propylene glycol monostearate.

9. The cake batter system of claim 6 in which the high temperature batter stabilizer is selected from the group consisting of
(a) the saturated fatty acids containing from about 14 to about 22 carbon atoms;
(b) the condensation product of material selected from the group consisting of partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from three to six carbon atoms and having from zero to four hydroxy groups, said condensation product having at least one free carboxyl group per molecule;
(c) the condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;
(d) the condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;
(e) the condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;
(f) the hydrogenated vegetable phosphatides having iodine values of less than about 30; and
(g) the hydroxylated vegetable phosphatides.

10. The cake batter system of claim 6 in which the polyvalent metal ion is derived from salts selected from the group consisting of the non-toxic, water-soluble salts of copper, magnesium, calcium, zinc, strontium, cadmium, barium, aluminum, titanium, tin, manganese, iron, cobalt, and nickel.

11. A dry cake mix adapted to form a cake batter system comprising shortening, flour, and sugar, improved with from about 0.5% to about 16%, by weight of the shortening, of an alpha-phase crystal-tending emulsifier which is lipophilic and hydrophilic and contains at least one higher fatty acid radical having from about 12 to about 22 carbon atoms and at least one free and unesterified hydroxyl group, from about 0.1% to about 8%, by weight of the shortening, of a high temperature batter stabilizer, and from about 0.001% to about 1.0%, by weight of the batter emulsion, of a non-toxic, water-soluble polyvalent metal ion salt.

12. The dry cake mix of claim 11 in which the alpha-phase crystal-tending emulsifier is selected from the group consisting of monoesters of straight chain aliphatic diols with saturated fatty acids, said diols containing from 3 to 5 carbon atoms and said saturated fatty acids containing from about 14 to about 22 carbon atoms.

13. The dry cake mix of claim 11 in which the alpha-phase crystal-tending emulsifier is propylene glycol monostearate.

14. The dry cake mix of claim 11 in which the high temperature batter stabilizer is selected from the group consisting of
(a) the saturated fatty acids containing from about 14 to about 22 carbon atoms;
(b) the condensation product of material selected from the group consisting of a partial fatty acid glyceride containing an average of from one to two fatty acid radicals having from about 14 to about 22 carbon atoms and a monoester of a straight chain aliphatic diol and a saturated fatty acid, said diol containing from three to five carbon atoms and said saturated fatty acid having from about 14 to about 22 carbon atoms, with a polycarboxylic acid containing from three to six carbon atoms and having from zero to four hydroxy groups, said condensation product having at least one free carboxyl group per molecule;
(c) the condensation product of a saturated fatty acid containing from about 14 to about 22 carbon atoms with a hydroxy polycarboxylic acid containing from three to six carbon atoms and having from one to four hydroxy groups, said condensation product having at least one free carboxyl group per molecule;
(d) the condensation product of a saturated straight chain fatty alcohol having from about 14 to about 22 carbon atoms with a dicarboxylic acid containing three to six carbon atoms and having no hydroxy groups, said condensation product having at least one free carboxyl group per molecule;
(e) the condensation product of partial fatty acid glyceride containing an average of from one to two fatty acid radicals having from about 14 to about 22 carbon atoms with a monoester of a polycarboxylic acid and a saturated straight chain fatty alcohol, said polycarboxylic acid containing from three to six carbon atoms and having from one to four hydroxy groups and said fatty alcohol having from about 14 to about 22 carbon atoms;

(f) the hydrogenated vegetable phosphatides having iodine values of less than about 30; and
(g) the hydroxylated vegetable phosphatides.

15. The dry cake mix of claim 11 in which the polyvalent metal ion is derived from salts selected from the gorup consisting of the non-toxic, water-soluble salts of copper, magnesium, calcium, zinc, strontium, cadmium, barium, aluminum, titanium, tin, manganese, iron, cobalt, and nickel.

References Cited by the Examiner
UNITED STATES PATENTS

| | | | |
|---|---|---|---|
| 3,145,107 | 8/1964 | Howard | 99—118 |
| 3,145,108 | 8/1964 | Howard | 99—118 |
| 3,145,109 | 8/1964 | Howard | 99—118 |

A. LOUIS MONACELL, *Primary Examiner.*

RAYMOND N. JONES, *Examiner.*